E. CHAPMAN.
GRAIN-BINDER.

No. 192,151. Patented June 19, 1877.

Witnesses
Chas. H. Smith
Harold Serrell

Inventor
Edwin Chapman
per L. W. Serrell
Atty.

E. CHAPMAN.
GRAIN-BINDER.

No. 192,151.  Patented June 19, 1877.

Witnesses:
Chas. H. Smith
Harold Serrell

Inventor
Edwin Chapman
per Lemuel W. Serrell
atty

UNITED STATES PATENT OFFICE.

EDWIN CHAPMAN, OF ROCHESTER, MINNESOTA, ASSIGNOR TO CHAPMAN BINDER COMPANY, OF SAME PLACE.

IMPROVEMENT IN GRAIN-BINDERS.

Specification forming part of Letters Patent No. 192,151, dated June 19, 1877; application filed January 2, 1877.

*To all whom it may concern:*

Be it known that I, EDWIN CHAPMAN, of Rochester, in the State of Minnesota, have invented an Improvement in Grain-Binders, of which the following is a specification:

This improvement is to be used upon any harvester in which the cut grain is elevated and then delivered upon a platform for binding automatically.

In my machine there is a receiver for the grain, at the bottom of which is a hinged platform-section, that is raised at the proper time to deliver the grain upon the binding-platform. This feature, however, is not my invention. The wire, after it has been put around the bundle, is twisted together by a revolving T-headed twister similar to that shown in my Patent No. 184,505.

The improvements in this application relate to elevating-ribs upon the platform, that raise the grain sufficiently to allow the point of the wire-carrying arm to pass in between the grain and platform, thereby lessening the risk of the straw becoming entangled in the point of the wire-carrier, which often happens in machines where the point of the wire-carrier passes through a slot in the platform.

I also make use of gathering-arms, swinging with the wire-carrier, and compressors and pushers operated beneath the platform, and extending up through slots in said platform, to aid in consolidating the bundle, and in delivering the same when bound. I also improve my aforesaid twister by operating the cutters by a peculiar toggle, and the links to the cutters are adjustable to compensate wear upon the knives or in the joints. The wire-carrying arm has a bow-guard, that keeps the grain from falling until the wire-carrier is raised.

Figure 1:
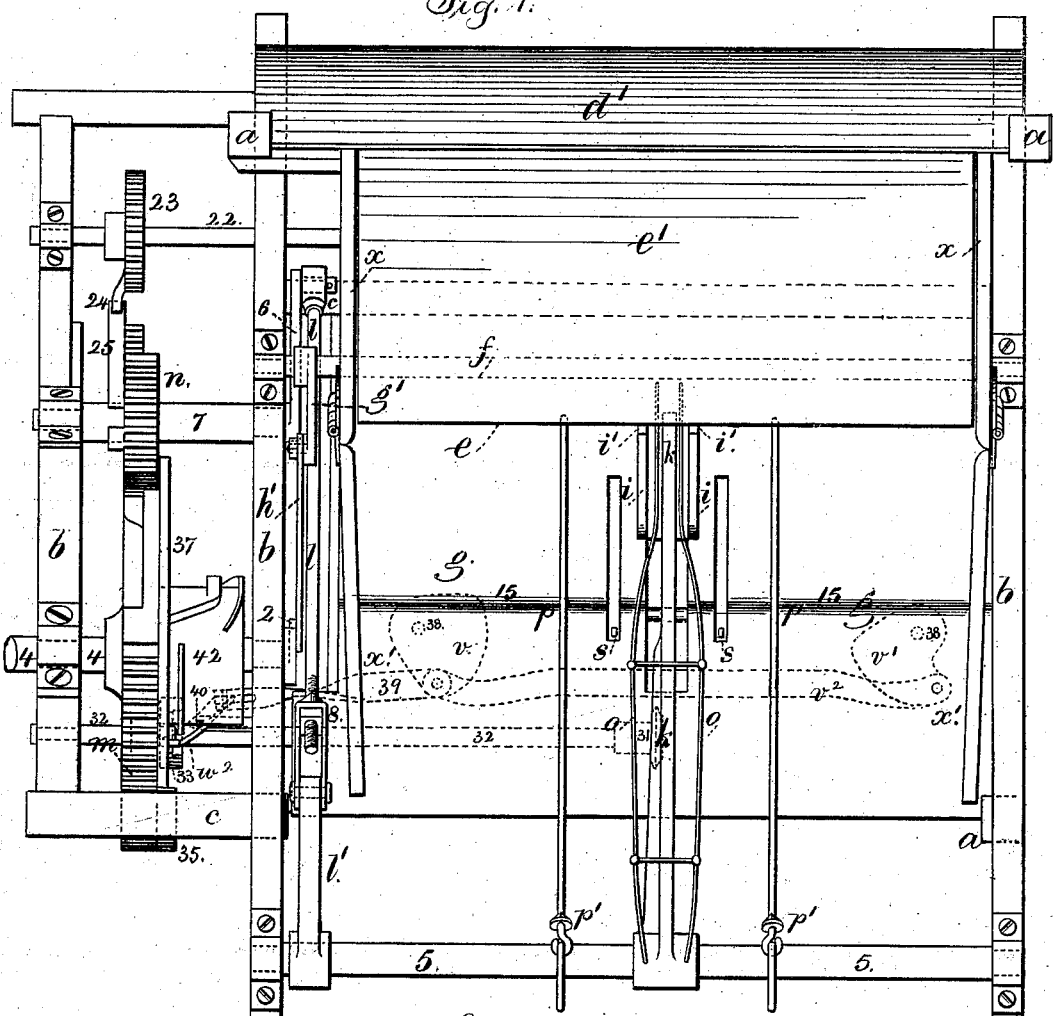
Figure 3:
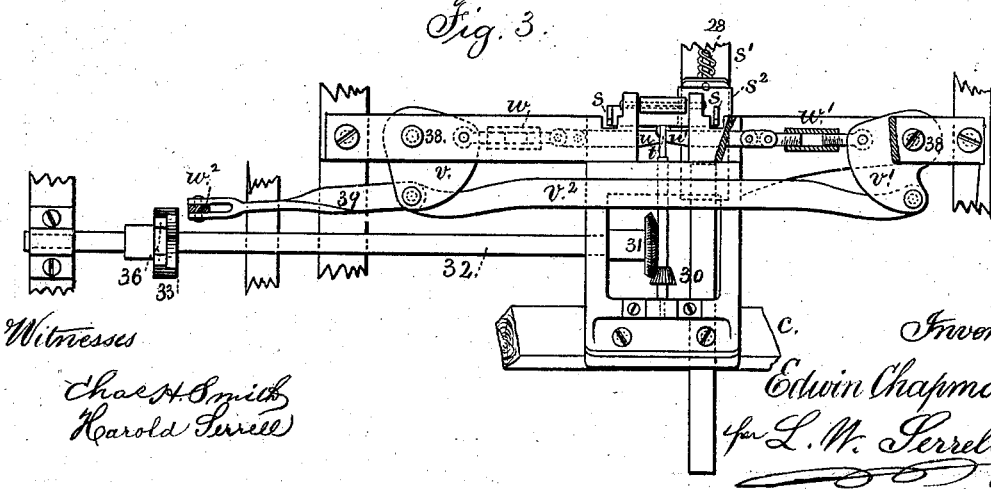
Figure 2:
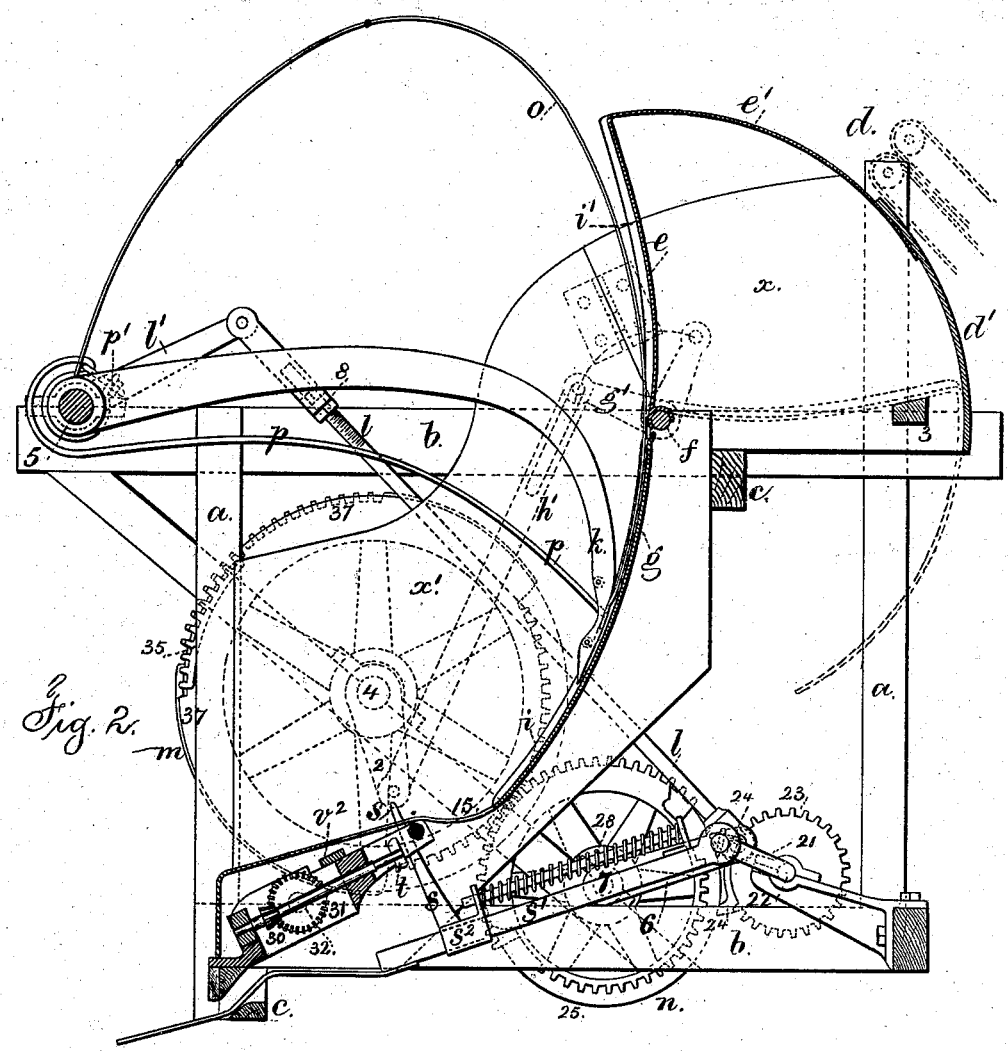

In the drawing, Figure 1 is a plan of the binding mechanism. Fig. 2 is a vertical section of the same, and Fig. 3 is a plan of the twisting devices.

The frame of the machine is of a size and shape adapted to receive the parts, and to be connected to the harvester. I have shown the uprights $a$, longitudinal beams $b$, and cross-beams $c$, and this frame is sustained upon suitable rollers or wheels, as usual.

The grain is brought up by an endless apron to the grain-receiver. The rollers and aprons at $d$ represent the location of the elevator.

At the back of the grain-receptacle is a curved stationary shield, $d'$, and the hinged section of the platform is made of the curved face $e$ and cylindrical segment $e'$ at the back, adjacent to the stationary shield. This section of the platform is attached to the cross-shaft $f$, that forms a hinge for the same, and also serves for moving the said section up into the position shown by full lines in Fig. 2, or down into the position shown by dotted lines.

The platform $g$ is inclined and curved. The operation of this receiver and hinged section of the platform will be set forth hereinafter. I remark that the same is not original with me. I, however, have arranged a mechanism for operating the same, which consists of the crank $g'$, slotted link $h'$, and crank 2 upon the main driving-shaft 4. The lengths of the cranks 2 and $g'$, and of the slot in the link $h'$, are such that the hinged platform-section will be swung up suddenly, and then immediately lowered after the crank 2 has passed the center, and then the platform-section will remain at rest in a nearly horizontal position upon supports 3, while the main shaft 4 moves the remainder of its revolution, the slot in the link $h'$ allowing of the same.

When the hinged section of the platform is swung up vertically the wire-carrier $k$ upon the shaft 5 is operated and passes across the surface of $e$, and then down the surface of the platform $g$, carrying down the loose grain that has been discharged from the receiver upon the platform $g$ by the swinging up of the hinged section, and immediately thereafter the hinged section drops back by the movement of the crank and link, and forms a receiver, into which the grain falls from the elevator while the binding operation is being performed.

If the platform $g$ was slotted, as has heretofore been done, the end of the wire-carrier in passing through the same would be likely to carry some of the straws with it, and become obstructed. I prevent this difficulty and dispense with the slot by the elevating-ribs $i$ upon the platform $g$, between which the point of the wire-carrier passes, and these ribs raise the grain sufficiently from the platform for the point of the carrier to pass beneath the straw.

Upon the surface of the section $e$ there are ribs $i'$, that form continuations of the ribs $i$ for the same purpose.

The wire-carrier $k$ and shaft 5 are operated by the crank 6 upon the second shaft 7, and and a pitman, $l$, that extends to the arm $l'$ on the shaft 5. There is a turn-buckle or screw-adjuster, 8, in the pitman $l$, to regulate its length accurately, so that the point of the wire-carrier reaches the twisting mechanism upon its downward movement, and the second shaft 7 receives its motion at the proper time by the stop-motion gears $m$ and $n$, that are provided with teeth and with cylindrical segments substantially similar to those in Letters Patent No. 123,237, so that the second shaft 7 will be turned at the proper time to bring down the wire-carrier, and pause while the wire is being twisted, and then the further movement of the shaft 7 elevates the wire-carrier, and it again pauses while the platform-section is being tilted.

Upon the back of the wire-carrier there is a bow-guard, $o$, that is an arc of a circle from the shaft 5, and hence it moves close to the surface of the curved platform $g$, and forms a stop to prevent grain falling upon the upper side of the wire-carrier when it is depressed, and hence the grain will remain in the receiver until the wire-carrier is swung up again.

When the wire-carrier is moved up the end of the wire is held at the twister, the same as usual in grain-binders; hence, when the grain is delivered from the receiver by the hinged section $e$ $e'$ swinging up, the grain slides down the platform and stops against the said wire. I also provide a curved ledge at 15 in the platform, that serves to check the movement of the grain as it falls down the platform, in order that it may be formed into a more uniform and compact bundle. The ledge 15 in the platform allows the twisting mechanism to be properly located relatively to the wire-carrying arm, and the end of that arm travels above the platform, as aforesaid, and enters an opening in the platform at the ledge 15, so as to pass to the twister.

To consolidate the grain and lessen the strain upon the wire in forming the bundle, I make use of the gathering-arms $p$, that are formed of spring-wire, coiled at the shank around the shaft 5, and secured by the clamping-screws $p'$, that are each made with a hooked end to hook into the wire at the bend thereof, and pass through an eye at the end of the wire, so that the gathering-arms can be adjusted to give more or less pressure on the bundle by turning the arms upon the shaft 5 and then tightening the clamping-screw. The ends of these arms $p'$ move clear of the surface of the platform until they reach the ledge or offset 15, where their further movement is arrested; hence, the gatherers do not tend to carry the bundle off the platform.

The bundle, after it has been bound, might lie upon the platform, and it would not materially interfere with the wire or the fall of grain to form the next bundle, and the bound bundle would be forced off the platform by the pressure of the gatherers against the next bundle of grain. However, I prefer to deliver each bundle as bound, and for this purpose employ the pushers $s$, that are upon a bar, $s^1$, below the platform, and said bar is reciprocated periodically and the pushers moved up and down by the action of the crank 21 upon the shaft 22.

The shaft 22 receives a complete revolution, and then pauses by the stop-motion pinion 23, that is made without teeth on one part to allow the teeth of the wheel $n$ to be inoperative while the stops 24 rest upon the circular segment 25, and the segment 25 is interrupted at the place where the teeth of $n$ gear into the teeth of 23, and give to the same a complete revolution. This stop-motion is similar to that in said Patent No. 123,237.

The pushers $s$ are upon a frame, $s^2$, that slides upon the bar $s^1$, and the pushers are kept forward by the spring 28; but they can yield and slide back when necessary, and there are openings through the platform for the pushers $s$ to reach the bundle.

The end of the bar $s^1$ slides in a support in the frame, and, as the crank rises and moves forward, the pushers act against the bundle, and as soon as it is bound they eject it from the platform, the spring 28 yielding until the bundle is bound and the wire cut.

It will generally be preferable to time the movements, so that the pushers $s$ will project through the platform $g$ and stand nearly in line with the wire as the gavel of grain is delivered down the platform; hence, the ends of $s$ will form stops, against which the bundle will be consolidated by the gathering-arms $p$ as the wire is drawn around the bundle; then the pushers $s$ are carried forward and downward, and brought back beneath the bundle and raised, and again carried forward while the wire is being cut and twisted. The spring of the pushers will be compressed as the pushers $s$ act against the bundle, and as soon as the wire is cut the spring-pushers will eject the bundle and assume their normal position. By the joint operation of the parts, as aforesaid, the bundle can be consolidated with less risk than heretofore of breaking the wire.

The twister $t$, that operates upon the wire, is a tapering shank, with a T-head similar to that in the Patent No. 184,505, and requires no further description. The device for revolving the same is a bevel-pinion, 30, bevel-wheel 31, shaft 32, and pinion 33, acted upon by the segmental gear 35 upon the wheel $m$, and there are stops 36, that rest against the cylindrical segment 37, to prevent the parts moving until the segmental gear 35 reaches the teeth of the pinion 33. This device brings the twister into operation at the correct time.

The cutters $u\ u'$ separate the wire coil remaining around the shank the same as in the aforesaid patent; but they are actuated by the toggle-levers $v\ v^1$, that swing upon the bolts 38, and are connected by the turn-buckle screws $w\ w^1$ with the knives or cutters $u\ u'$, so that the knives can be adjusted as they or the joints wear from time to time, so as to cut the wire properly.

The toggle-levers $v\ v^1$ are connected by the rod $v^2$, and there is a link, 39, to a lever, $w^2$, which has its fulcrum at 40 on the frame of the machine, and is brought into action at the proper time by the cam 42 upon the side of the wheel $m$.

The cutters operate after the wire has been twisted, and they liberate the bundle that has been bound, but allow a coil of wire to remain upon the shank of the twister, as in aforesaid patent.

At the ends of the grain-receiver there are wind-boards $x$, that protect the grain while in said receiver, and from their rear edges the guard-boards $x'$ extend down the platform, and are hinged at their upper ends, so as to be adjusted and direct the grain to the binder.

I claim as my invention—

1. The platform $g$ and ribs $i$, curved in an arc of a circle from the center of the shaft 5, and having an upward curved ledge, 15, and an opening for the wire-carrying arm $k$, in combination with said wire-carrying arm $k$, shaft 5, spring gathering-arms $p$, and the wire-twisting mechanism that is beneath the ledge 15, substantially as set forth.

2. The pushers $s$ below the platform, and passing through slots in the platform, and also acting as stops, in combination with the ledge 15, gathering-arms $p$, and wire-carrying arm $k$, substantially as set forth.

3. In a grain-binder, the combination, with the wire-carrier and twisting mechanism, of the pushers $s$, that pass through slots in the platform and act as stops, as and for the purposes set forth.

4. The pushers $s$, fitted to slide upon the bar $s^1$, and the compressing-spring 28, in combination with the actuating-crank 21, shaft 22, and stop-motion gearing, substantially as set forth.

5. In combination with the wire-twister $t$, the adjustable knives or cutters $u\ u'$, actuating-levers $v\ v^1$, and rod $v^2$, substantially as set forth.

Signed by me this 20th day of December, A. D. 1876.

EDWIN CHAPMAN. [L. S.]

Witnesses:
C. H. CHADBOURN,
THOS. H. MCCONNELL.